(12) United States Patent
Lettenbauer et al.

(10) Patent No.: US 8,706,281 B2
(45) Date of Patent: Apr. 22, 2014

(54) METHOD AND DEVICE FOR PRODUCING A MASTER DIE TOOL

(75) Inventors: Hubert Lettenbauer, Oberkochen (DE); Kai-Udo Modrich, Plüderhausen (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 453 days.

(21) Appl. No.: 13/055,295

(22) PCT Filed: Jul. 10, 2009

(86) PCT No.: PCT/EP2009/005195
§ 371 (c)(1),
(2), (4) Date: Jan. 21, 2011

(87) PCT Pub. No.: WO2010/009840
PCT Pub. Date: Jan. 28, 2010

(65) Prior Publication Data
US 2011/0130854 A1    Jun. 2, 2011

(30) Foreign Application Priority Data

Jul. 21, 2008  (DE) .......................... 10 2008 034 117

(51) Int. Cl.
*G06F 19/00* (2011.01)
(52) U.S. Cl.
USPC .............................. 700/98; 700/182; 382/141
(58) Field of Classification Search
USPC ..................... 700/182, 98; 382/141
See application file for complete search history.

(56) References Cited

U.S. PATENT DOCUMENTS 5,442,572 A * 8/1995 Kiridena et al. ............. 382/141

5,848,115 A    12/1998 Little et al.

FOREIGN PATENT DOCUMENTS

EP    0 875 751 A1    11/1998
JP    2008036889 A    2/2008

OTHER PUBLICATIONS

Tutsch, Rainer, "Fertigungsmesstechnik—Teil C", Handbuch der Mess- und Automatisierungstechnik in der Produktion VDI-Buch, 2006, pp. 199-362.
Brick, et al. "Analysis of three-dimensional sinter shrinkage or copings made from alumina in an innovative direct shaping process", Computerized Medical Imaging and Graphics 28, 2003, pp. 159-165.

* cited by examiner

*Primary Examiner* — Tejal Gami
(74) *Attorney, Agent, or Firm* — Laurence A. Greenberg; Werner H. Stemer; Ralph E. Locher

(57) ABSTRACT

A device and a method for the production of a master die tool for a component. The method includes the following steps: a) receiving or creating a CAD model of the component; b) deriving a surface model for the master die tool based on the CAD model of the component; c) creating the master die tool with NC machines using the surface model; d) producing an entity of the component using the master die tool; e) detecting the contours of the entity of the component by way of a computed tomography-based coordinate measuring device which supplies a 3D point cloud of surface points of the entity of the component; f) comparing the 3D points of the 3D point cloud to the CAD model, and determining whether any deviations exist beyond predetermined tolerance thresholds, and if this is the case g) modifying the surface model based on the deviations detected; h) reworking the master die tool or recreating the master die tool with the NC machines based on the modified surface model; i) repeating steps d) to h) until no more deviations exist beyond the predetermined tolerance thresholds.

6 Claims, 2 Drawing Sheets

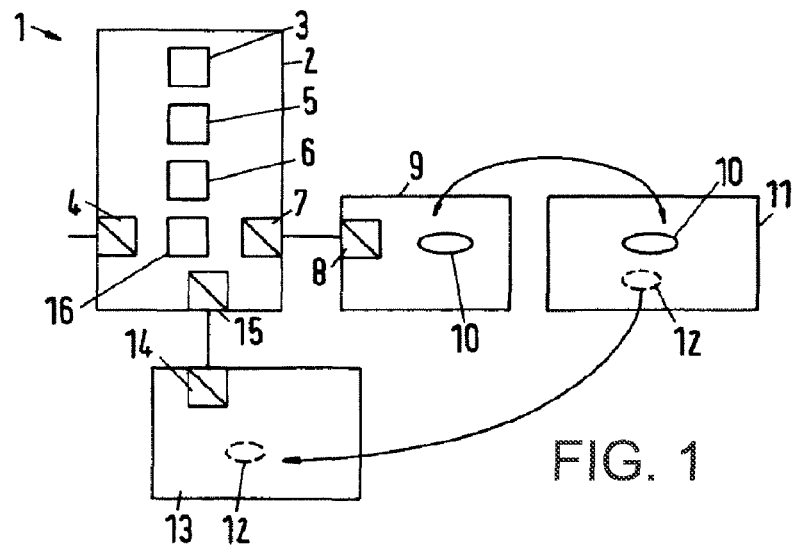
FIG. 1
FIG. 2
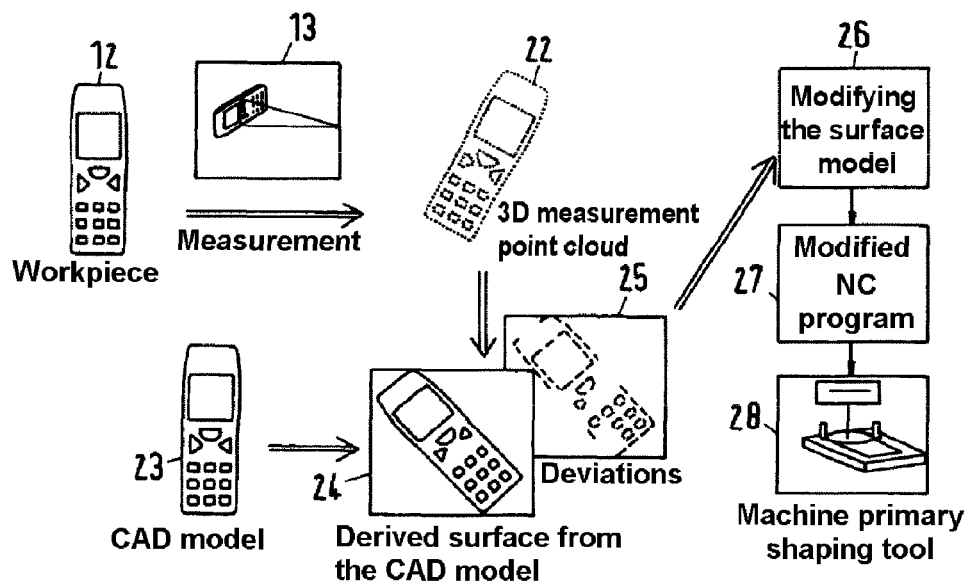

METHOD AND DEVICE FOR PRODUCING A MASTER DIE TOOL

BACKGROUND OF THE INVENTION

Field of the Invention

The invention relates to a method and a device for producing a master die tool.

Master die tools are used for producing components in industrial production process. By way of example, master die tools are used in the field of injection molding or casting technology. A plurality of parts of apparatuses and devices are produced as components by means of primary shaping processes. By way of example, housings or housing shells of consumer goods, for example cellular phone shells, are produced as injection-molded parts.

Production methods that utilize a primary shaping method are distinguished by virtue of the fact that a master die tool can produce a large number of components in a simple fashion, with the components each assuming the shape prescribed by the master die tool. Hence the master die tool forms a "negative" shape of the component to be produced.

Nowadays, master die tools are preferably produced by means of computer-controlled machine tools in automated procedures. In the process, starting from a CAD model of the component to be produced, one or more master die tools are produced that have a negative surface shape of the component, as per the CAD model, to be produced. However, in practice, it has been found that, in a primary shaping process, master die tools with an exact negative shape of the component to be produced generally do not allow the production of components that correspond to the CAD model of the component. There generally are unpredictable deviations of the component produced in the primary shaping process from the intended component defined by the CAD model. In the prior art, such deviations are usually referred to as "shrinkage". However, even taking account of production processes during the primary shaping, whilst consulting simulations, it has to date not been possible to produce master die tools that produce components that are true to size and form, and correspond to the CAD model thereof.

In order to establish deviations of the component produced in the primary shaping process from the CAD model, or another intended specification, it is conventional to measure the component using a coordinate measuring appliance. The prior art has disclosed mechanical coordinate measuring appliances, in which a surface of the component is sampled by a test probe. In the process, the test probe is displaced relative to the component by a displacement apparatus. The latter discloses the coordinates of the test probe in three-dimensional space at any one time. As soon as the test probe contacts the component, the coordinate of the test probe specifies a surface coordinate of the component. Complex and time-consuming measurements are required to scan a workpiece or component in its entirety by using this method. Moreover, complex component shapes can be sampled only with difficulty or in an insufficient manner by means of such a mechanical coordinate measuring appliance.

The prior art has moreover disclosed coordinate measuring appliances that use computed-tomography-based methods. Herein, invasive radiation is used to examine the component or workpiece. By way of example, in computed tomography (CT), the component is generally arranged on a rotary table and irradiated by X-ray radiation from different directions by rotating the rotary table into different rotational positions. However, other examination arrangement geometries are also possible and known. The radiation attenuated by extinction in the material of the component or workpiece is detected in a spatially and temporally resolved fashion by a sensor apparatus. By way of example, in practice between 800 and 1200 projection images of the measurement object are recorded, with the rotational position being changed by a constant angular value between each of the projections. By applying one of many known methods from tomographic reconstruction, for example filtered back-projection, a three-dimensional image of the workpiece is calculated therefrom. The 3D image respectively specifies the local linear absorption coefficient for individual small volume regions (voxels). An example of CT is described in DE 39 24 066 A1. Hence a CT coordinate measuring appliance supplies a 3D point cloud of surface points of the measured component.

The prior art requires the master die tool, originally produced by means of computer-aided machine tools, to be reworked over a plurality of iteration steps. Here the master die tool is generally modified by manual intervention of experienced shaping staff.

BRIEF SUMMARY OF THE INVENTION

The invention is based on the technical object of specifying a method and a device by means of which master die tools can be produced more easily, more particularly in an automated fashion to the largest possible extent.

According to the invention, the technical object is achieved by a method as claimed and by a device or a system with the features as claimed. Advantageous embodiments of the invention emerge from the dependent claims.

Herein, provision is first of all made for receiving or generating a CAD model of the component. To this end, a device or a system for producing a master die tool comprises a computer system. The computer system may be a workstation or else a multiplicity of very differently designed, networked computers. The master die tool for the component is subsequently created by means of computer-controlled machines, which are also referred to as numerical control (NC) machine tools, with the aid of the CAD model of the component, or a surface model for the master die tool derived therefrom. A device for producing a master die tool thus comprises computer-controlled machine tools, coupled to the computer system in an information-technical fashion, for producing the master die tool whilst using control programs. The open- and -closed loop control units required for this may be provided in the computer-controlled machine tools. Other embodiments provide for the open- and -closed loop control to be performed entirely within the computer system and for the machine tools merely to be actuated via communication interfaces.

The master die tool produced in this fashion subsequently produces an entity of the component in a primary shaping process or primary shaping method. A primary shaping device is used to produce an entity of the component by means of the created master die tool.

The contours of the entity of the component are subsequently registered by means of a coordinate measuring appliance, more particularly a computed-tomography-based coordinate measuring appliance, which supplies a 3D point cloud of surface points of the entity of the component. The 3D points of the 3D point cloud are compared to the CAD model, and established whether there are deviations above predefined tolerance levels. Should this be the case (which, as emerges from the statement of the problem, is generally always the case), the surface model of the master die tool is modified on the basis of the established deviations. In the process, appropriately corrected 3D points are generated, which define the modified surface model. By utilizing the modified surface model for the master die tool, said master die tool is reworked using the computer-aided machine tools or, should this prove to be impossible, recreated. Subsequently, the steps of producing an entity, registering the contours of the entity and comparing the 3D points established thereby with the original CAD model and, if required, further modifying the surface model and renewed reworking are carried out iteratively until there are no deviations above the predefined tolerance levels (anymore). The surface model is modified in an automated fashion on the basis of the established deviation. As a result, the production method is largely automated. Only simple scaffolding work, monitoring work, etc. is necessary for producing the master die tool for the component. In general, one iteration step is sufficient for generating a master die tool by means of which components or workpieces can be produced, which correspond to the intended component prescribed by the CAD model within the scope of the predefined tolerance levels.

So that the computer-aided machine tools can be actuated in an optimal fashion, one embodiment provides for an NC program (or NC programs) for controlling the NC machine tools during the creation and/or modification/recreation of the master die tool to be respectively created in an automated fashion on the basis of the surface model, which may already be modified, of the master die tool.

Provision is preferably made for a corrected 3D point to be determined for each 3D point of the registered 3D point cloud on the basis of the established deviation from a corresponding intended point as per the CAD model. In this case it is understood that a point density of the 3D points of the 3D point cloud, which are established by means of the computed-tomography-based coordinate measuring appliance, is selected to match a desired component tolerance level.

Modifying the surface model comprises establishing corrected 3D points, which define the modified surface model of the master die tool, wherein, as a first approximation, the registered 3D points of the 3D point cloud are mirrored on the surface of the master die tool defined by the (modified) surface model in accordance with their established deviation from a point on an intended surface as per the CAD model, which respectively corresponds thereto.

This is because, as a first approximation, a shape is at a site of a deviation, precisely for correcting this deviation in order to obtain a workpiece or a component, which, taking into account the shrinkage occurring during the production, supplies an entity of the component corresponding to a shape defined by the CAD model.

In one embodiment, mirroring on the surface of the modified surface model is brought about by drawing a straight line through a 3D point and a corresponding point on the intended surface of the component as per the CAD model. A distance vector is established, which points from the 3D point to the corresponding point on the intended surface. The distance vector is then displaced along the straight line such that the initial point of said vector coincides with an intersection point of the straight line and the surface of the master die tool as per the (modified) surface model, with the displaced distance vector pointing to the corrected 3D point.

A further improved result, and hence a reduction in the iteration steps to preferably one iteration step, is obtained if the material properties of a material used to produce the entity of the component and/or parameters of the production method used to produce the entity of the component and/or a local geometry around the individual registered 3D points of the 3D point cloud and/or a local geometry around the corresponding intended points of the CAD model and/or a local geometry around the points, corresponding to the intended points, on the surface as per the (modified) surface model and/or a local geometry around the individual emerging corrected 3D points are taken into account when establishing the corrected 3D points. It is advantageous and important to take into account the different local geometries because deviations, i.e. changes in the generated master die tool, should, as a function of the material utilized in the primary shaping method, be undertaken that are greater or less than the deviations that were established by comparing the entity of the component with the CAD model. Thus, for example, if provision is made for narrow, deep recesses in a master die tool embodied as an injection mold for making thin, protruding structures on the component, it may be necessary for the recess to have a significantly larger width than the intended protruding structures of the component should have in time. Likewise, use can be made of smoothing algorithms in order to obtain a continuous shape of the master die tool, without undesired edges, for individual measuring points having a large local deviation.

The features of the device according to the invention or the system according to the system have the same advantages as the corresponding features of the method according to the invention.

BRIEF DESCRIPTION OF THE SEVERAL VIEWS OF THE DRAWING

In the following text, the invention will be explained in more detail on the basis of preferred exemplary embodiments and with reference to a drawing, in which:

FIG. 1 shows a schematic illustration of a system or a device for producing a master die tool;

FIG. 2 shows a schematic illustration for explaining the reworking of the master die tool;

DESCRIPTION OF THE INVENTION

Figure 3:
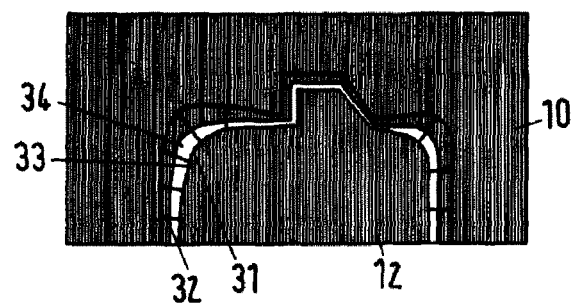
FIG. 3 shows a schematic illustration of a superposition of the contours of a produced entity of a component, an intended shape of the component and a modified surface shape into which the master die tool should be converted.

FIG. 1 schematically shows a system or a device 1 for producing a master die tool. The device comprises a computer system 2, which may be an individual computer or may consist of a plurality of computers that are networked together or communicate with one another by other means. The computer system is embodied such that a component can be designed thereon by computer-aided means such that a CAD model of the building block to be produced is produced. Hence the computer system 2 comprises a design module 3. Alternatively, CAD model data of the component can be received via an interface 4. The CAD model is used to derive a surface model for the master die tool to be produced. Furthermore, the CAD model of the component can be used to establish an intended surface of the component. In some embodiments, use can even be made of parameters of the material used for producing the component, parameters of a production method and empirical values, stored in the form of data, for example templates for certain geometric molding and/or surface units, during the process of establishing the surface model, and so even the first surface model of the tool mold can deviate from the intended surface of the component. The surface model is calculated or derived in a surface-model module 5 of the computer system 2. Control programs (NC programs) are generated in an NC program module 6 on the basis of the surface model for the master die tool. A master die tool 10 is produced with the aid of these NC programs, which are interchanged between the computer system and computer-controlled machine tools 9 via interfaces 7, 8. The master die tool 10 has a surface corresponding to the surface model. An entity 12 of the component to be produced is subsequently produced in a primary shaping device 11 with the aid of the master die tool 10.

The entity 12 of the component is measured in a coordinate measuring appliance 13. The coordinate measuring appliance is preferably embodied as a computed-tomography-based coordinate measuring appliance. The computed-tomography-based coordinate measuring appliance supplies a 3D point cloud of 3D points that specify an established surface contour of the entity 12 of the component. This data is transmitted to the computer system 2 via interfaces 14, 15. A deviation module 16 establishes a deviation of the surface shape of the produced entity 12 of the component established in this fashion from the intended surface defined by the CAD model. The surface-model module 5 establishes a modified surface model of the surface of the master die tool on the basis of the deviations. NC programs modified by the NC program module 6 are subsequently generated and transmitted to the computer-controlled machine tools 9. This computer-controlled machine tool 9 reworks the master die tool 10 or, should this prove to be impossible, produces it anew, a surface contour of the master die tool 10 now corresponding to the surface as per the modified surface model. Subsequently, a further entity of the component is produced in the primary shaping device 11. The latter is once again measured using the coordinate measuring appliance 13. The deviation module 16 once again establishes the deviations from the CAD model and, should there still be deviations above a tolerance level, the master die tool 10 is once again modified on the basis of the established deviations.

If there are no deviations above the predefined tolerance level, the production of the master die tool 10 is complete and said tool can be used, for example, in mass production for producing a multiplicity of entities of the component.

FIG. 2 once again illustrates the method steps for modifying or reworking the master die tool. The same technical features have been denoted with the same reference signs. In the illustrated case, the entity 12 of the component is a shell for a cellular phone. Said shell is first measured by the coordinate measuring appliance 13, which is preferably designed as a computed-tomography-based coordinate measuring appliance. In the process, the entity of the component is irradiated a number of times at different orientations by X-ray radiation; the resulting irradiation images are converted by means of a computer into a 3D measurement point cloud (abbreviated as 3D point cloud 22) that represents the coordinate points of a surface of the entity of the component.

Furthermore, there is a CAD model 23 of the component. Said CAD model is, as indicated in block 24, compared to the 3D point cloud 22. This results in deviations, which are indicated schematically in block 25. These deviations are used to modify 26 a surface model of the master die tool. This means that, for example, a standard template library, i.e. templates for components of a surface, is modified or modified templates are used in order to obtain the modified surface model. Alternatively, use can be made of a point model and the latter may be modified. The surface model representation can be selected such that it is matched to the component. It is preferable to use a point model. A modified NC program 27 is derived from the modified surface model and said NC program is used to control the computer-controlled machine tool 28 when reworking the master die tool.

FIG. 3 illustrates the superposition of a contour 31 of an entity 12 of the produced component, a contour 32 of an intended surface as per the CAD model, which, in the described example, likewise equates to a surface of the master die tool as per the surface model of the master die tool 10 derived from the CAD model (first iteration step), and a contour 33 of the surface, which the master die tool should assume as per a modified surface model. Shrinkage 34 can clearly be made out; it is represented by an area between the contour 31 of the entity of the component and an intended surface 32 as per the CAD model. The larger a deviation is between a surface point, i.e. a 3D point in the 3D point cloud of the produced entity 12 of the component, and a corresponding point on the intended surface, the more strongly the surface shape of the modified surface model must deviate from the CAD model or the surface shape as per the original surface model. Here, the 3D points established by the coordinate measuring appliance are, as a first approximation, mirrored on the surface of the CAD model. However, this only holds true for a first iteration step.

Figure 4:
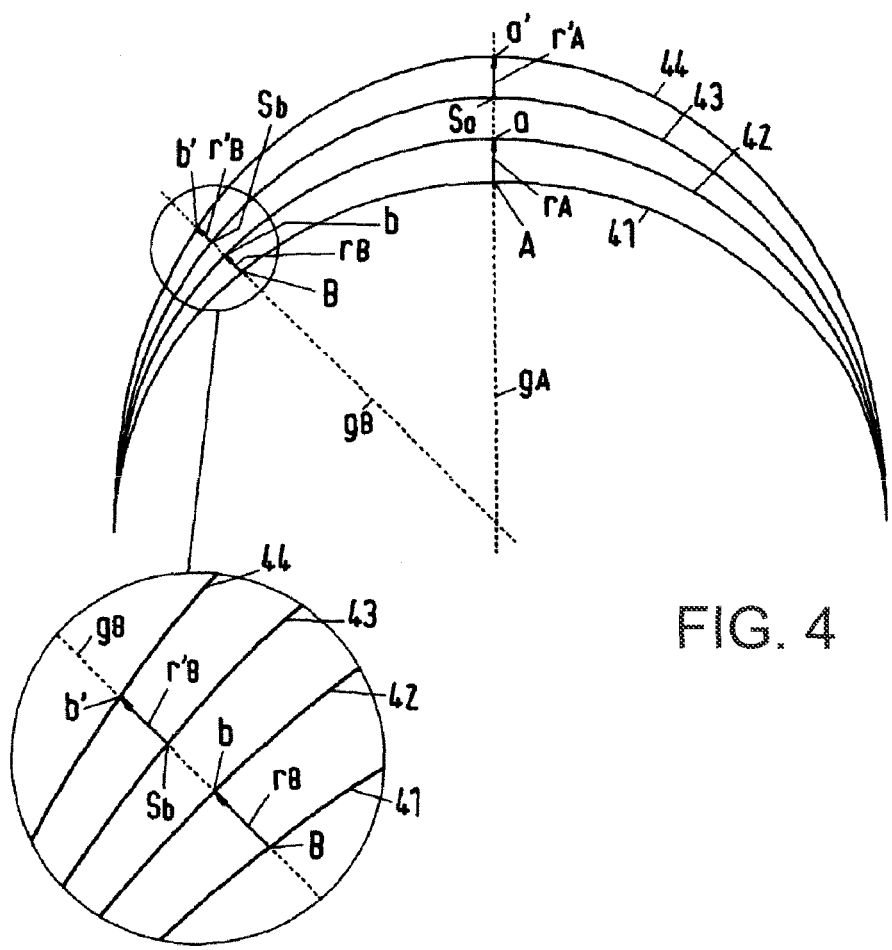
FIG. 4 shows a schematic illustration similar to that according to FIG. 3 for a subsequent iteration step.

FIG. 4 illustrates the superposition of a contour 41 of a further entity of a further component, established by means of the coordinate measuring appliance, a contour 42 of an intended surface as per the CAD model for the further component, a contour 43 of a surface of the master die tool, which was already modified or the original surface model of which was already modified with respect to the intended surface of the component from the outset due to taking account of parameters of the production of the component, and a surface contour 44 obtained after a further modification of the surface model of the master die tool. Distance vectors $r_A$, $r_B$ to corresponding points a, b on the contour 42 of the intended surface as per the CAD model are plotted for two 3D points A, B of the established surface contour 41 of the entity of the further component. Furthermore, straight lines $g_A$, $g_B$ are defined by mutually corresponding points A, a and B, b. The established distance vectors $r_A$, $r_B$ are now preferably used to establish corrected 3D coordinate points a', b', which define the modified surface model of the master die tool, by displacing these along the straight lines $g_A$ and $g_B$ such that respectively one initial point coincides with an intersection point $S_a$ or $S_b$ of the respective straight line $g_A$, $g_B$ and the contour of the surface model of the primary-shaping-tool version with which the entity of the further component was generated. Tips of the distance vectors $r'_A$, $r'_B$ displaced thus now point at the correspondingly corrected 3D points a', b', which, as a first approximation, define the contour 44 of the modified surface model of the master die tool. More detailed observation of the illustrated section reveals that the actually established contour 44 does not run through the corrected 3D point b'. This is due to the fact that, in addition to the absolute deviation, local geometry of the individual different contours 41-44 and parameters of the material used to produce the further component, and other method parameters of the primary shaping method are also taken into account.

The illustrated embodiments are merely exemplary embodiments.

LIST OF REFERENCE SIGNS

1 Device/System for producing a master die tool
2 Computer system
3 Design module
4 Interface
5 Surface-model module 6 NC program module
7, 8 Interface
9 Computer-controlled machine tool(s)
10 Tool mold
11 Primary shaping device
12 Entity of a component
13 Coordinate measuring appliance
14, 15 Interfaces
16 Deviation module
22 3D point cloud
23 CAD model
24 Block representing the establishment of deviations
25 Block illustrating deviations
26 Modifying the surface model
27 Deriving a modified NC program
28 Reworking of the tool mold
31 Contour of an entity of a produced component
32 Contour of an intended surface
33 Contour of the surface of the modified surface model
34 Shrinkage
41 Contour of a further entity
42 Contour of an intended surface as per the CAD model
43 Contour of a surface of the master die tool
44 Modified surface contour of the master die tool
A, B 3D points of the measured entity
a, b Points on the intended surface of the component as per the CAD model
$g_A$ Straight line through the points A and a
$g_B$ Straight line through the points B and b
$S_a$ Intersection points of the straight line $g_A$ with the contour of the surface of the tool mold used to produce the measured entity
$S_b$ Intersection points of the straight line $g_B$ with the contour of the surface of the tool mold used to produce the measured entity
$r_A$ Distance vector from the point A to the point a
$r_B$ Distance vector from the point B to the point b

The invention claimed is:

1. A method of producing a master die tool for a component, the method which comprises the following steps:
   a) receiving or generating a CAD model of the component;
   b) deriving a surface model for the master die tool based on the CAD model of the component;
   c) creating the master die tool with NC machines using the surface-model model;
   d) producing an entity of the component using the master die tool;
   e) detecting contours of the entity of the component by way of a computed-tomography-based coordinate measuring appliance, which supplies a 3D point cloud of surface points of the entity of the component;
   f) comparing the 3D points from the 3D point cloud with the CAD model and establishing whether or not there exist deviations above predefined tolerance levels, and, if such deviations exist:
   g) modifying the surface model on a basis of the deviations thus established to form a modified surface model;
   h) reworking the master die tool or recreating the master die tool with the NC machines on the basis of the modified surface model;
   i) repeating steps d) to h), until the deviations above the predefined tolerance levels have been eliminated; bringing about mirroring on the surface of the surface model or the modified surface model by drawing a straight line through a 3D point and a corresponding point on the intended surface of the component according to the CAD model, and by establishing a distance vector pointing from the 3D point to the corresponding point on the intended surface, displacing the distance vector along the straight line such that the initial point of said vector coincides with an intersection point of the straight line and the surface of the master die tool according to the surface model or the modified surface model, with the displaced distance vector pointing to the corrected 3D point.

2. The method according to claim 1, which comprises automatically creating an NC program for controlling the NC machines during the creation of the master die tool based on the surface model and/or during the modification/recreation of the master die tool based on the modified surface model.

3. The method according to claim 1, which comprises determining a corrected 3D point for each 3D point of the registered 3D point cloud on the basis of the established deviation from a corresponding intended point according to the CAD model.

4. The method according to claim 1, wherein a modified surface model comprises establishing the corrected 3D points, which define the modified surface model, wherein, as a first approximation, the registered 3D points of the 3D point cloud are mirrored on the surface of the master die tool defined by the surface model or the modified surface model in accordance with their established deviation from a point on an intended surface according to the CAD model, which respectively corresponds thereto.

5. The method according to claim 1, which comprises taking at least one of the following into account when establishing the corrected 3D points:
   material properties of a material used to produce the entity of the component;
   parameters of a production method used to produce the entity of the component; and
   one of a local geometry around the individual registered 3D points of the 3D point cloud, and/or a local geometry around the corresponding intended points of the CAD model, and/or a local geometry around the points, corresponding to the intended points on the surface according to the surface model or the modified surface model, and/or a local geometry around the individual emerging corrected 3D points.

6. A device for producing a master die tool for a component, comprising:
   a) a computer system for generating a CAD model of the component or receiving CAD model data of the component;
   b) NC machines connected to said computer system and configured to produce the master die tool by using NC programs;
   c) said computer system being configured to derive a surface model of the master die tool with the aid of the CAD model and, using the surface model, to automatically generate NC programs for controlling said NC machines;
   d) a primary shaping device for producing an entity of the component by way of the created master die tool;
   e) a computed tomography-based coordinate measuring appliance for measuring the entity of the component produced by said primary shaping device and supplying a 3D point cloud of surface points of the entity of the component;
   f) wherein said computer system is configured to compare the 3D points of the 3D point cloud with the CAD model and to establish whether any deviations exist above predefined tolerance levels and, should this be the case, to modify the surface model on the basis of the established deviations and create modified NC programs for reworking the master die tool or newly producing the master die tool using the NC machines with the aid of the modified surface model of the master die tool and control or initiate reworking/recreating;

g) wherein a process of producing entities, a process of measuring the entities, a process of establishing the deviations from the CAD model, a process of modifying the surface model of the master die tool and processes of renewed modifying and/or recreating the master die tool are carried out iteratively, automated to a largest extent possible; bringing about mirroring on the surface of the surface model or the modified surface model by drawing a straight line through a 3D point and a corresponding point on the intended surface of the component according to the CAD model, and by establishing a distance vector pointing from the 3D point to the corresponding point on the intended surface, displacing the distance vector along the straight line such that the initial point of said vector coincides with an intersection point of the straight line and the surface of the master die tool according to the surface model or the modified surface model, with the displaced distance vector pointing to the corrected 3D point.

* * * * *